United States Patent [19]

Moore

[11] 4,146,332

[45] Mar. 27, 1979

[54] SPECTROMETER WITH ELECTRONIC READOUT

[75] Inventor: Kenneth L. Moore, China Lake, Calif.

[73] Assignee: The United States of America as represented by the Secretary of the Navy, Washington, D.C.

[21] Appl. No.: 788,861

[22] Filed: Apr. 19, 1977

[51] Int. Cl.² .............................................. G01J 3/06
[52] U.S. Cl. ...................................... 356/308; 356/326
[58] Field of Search .................... 356/74, 81, 83, 84, 356/98, 99, 100, 229; 250/211 J; 358/107, 212

[56] References Cited

U.S. PATENT DOCUMENTS 2,240,722  5/1941  Snow ....................................... 356/84

FOREIGN PATENT DOCUMENTS 1074810  7/1967  United Kingdom .................... 356/229

OTHER PUBLICATIONS

Talmi, Analytical Chemistry vol. 47, No. 7, Jun. 1975, pp. 658A-660A, 662A-664A, 666A and 670A.

Primary Examiner—F. L. Evans
Attorney, Agent, or Firm—R. S. Sciascia; W. Thom Skeer

[57] ABSTRACT

A spectrometer with the basic optical elements is described which scans the spectrum electronically rather than by mechanical manipulation or use of image tubes. The detecting elements are light sensitive charge coupled device detector arrays.

3 Claims, 3 Drawing Figures

SPECTROMETER WITH ELECTRONIC READOUT

BACKGROUND OF THE INVENTION

This invention relates to spectrometers and in particular to spectrometers that provide a direct readout of the dispersed light.

The traditional spectrometer has used mechanical manipulation of the grating or prism element. Another technique that has become well known in the art is use of electronically scanned image tubes or semiconductors for photodiode arrays. Examples of this last technique can be found in U.S. Pat. Nos. 3,820,898 and 3,886,331.

In general these systems require sophisticated optical systems to gather sufficient light and are bulky. These factors have prevented spectrometers from being field-portable. To be mobile, simpler optical paths and self scanning detectors should be used since constant moving would be less apt to disrupt the alignment of known systems.

SUMMARY OF THE INVENTION

The present invention uses charge coupled devices (CCD) as detector arrays for a spectrometer. Examples of similar CCDs can be found in U.S. Pat. Nos. 3,789,240 and 3,919,468. By using more than one CCD the complete spectrum of incoming light can be observed. The use of electronic processing then combines the information from the CCDs to provide a complete spectrum analysis.

The dispersive element, such as a grating or prism, can be rigidly locked in place as well as the CCD's. Since the CCD's do not have to use electron beams with external electrical or mechanical switching the spectrometer can be made small and portable.

By including a reference in the supporting electronics, instaneous comparison of the observed spectra to known ones can be made.

Therefore, an object of the present invention is to provide a spectrometer free of the normal alignment problems in current spectrometers. Another object of the invention is to provide a spectrometer easily transportable for field use. Another object of the invention is to provide a way of analyzing the spectra observed during field use.

DESCRIPTION OF THE PREFERRED EMBODIMENT

Figure 1:
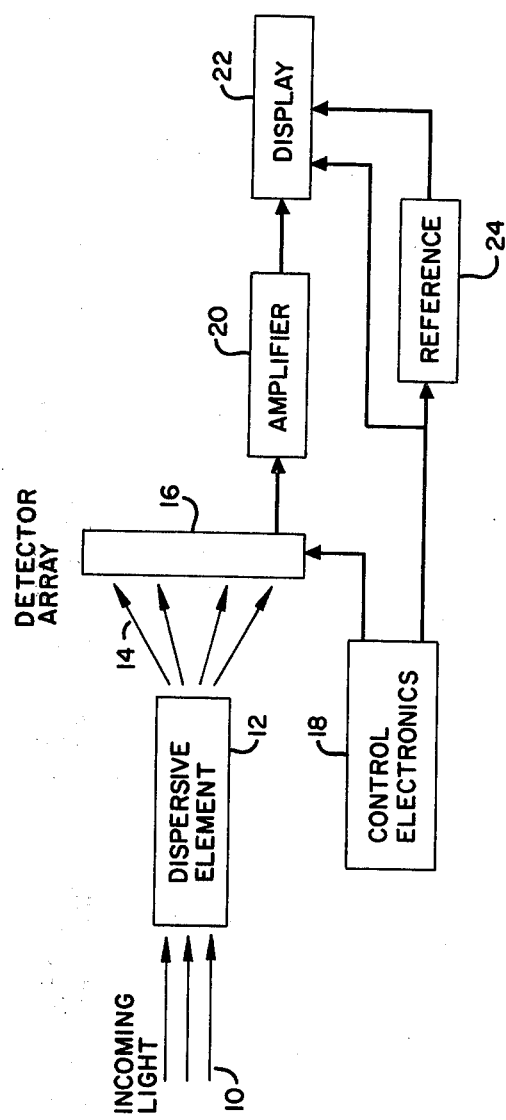
FIG. 1 is block diagram of the preferred embodiment.

In FIG. 1 incoming light 10 passes through dispersive element 12 which can be a grating or prism and is divided into its' component wavelengths at 14. Spectra 14 then strikes detector array 16 which is further shown in FIG. 2 and FIG. 3. Array 16 is a CCD array and is periodically scanned by control electronics 18. Scanning of CCDs is well known in the art and the patents cited previously should be relied on for details. The output of array 16 is amplified by amplifier 20 and observed on display 22. Display 22 can be a cathode ray tube, light emitting diodes, or any of the other devices well known in the art. By including reference 24, instantaneous analysis is possible. The calibration spectrum in reference 24 for identifying the output of the detector array 16 may consist of stored data from reference lamps or artificial data from a read only memory. One obvious means of display would be a dual trace oscilloscope.

Figure 2:
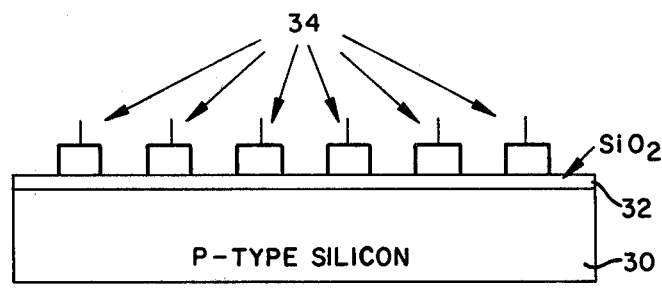
FIG. 2 is a cross-section of a CCD.

FIG. 2 is an example of a CCD cross-section. A P-type silicon layer 30 has an oxide layer 32 such as $S_iO_2$ separating the P-type layer 30 from electrodes 34. The wires from each electrode go to the clocking circuit of the control electronics. This type of circuit is well known in the art.

Figure 3:
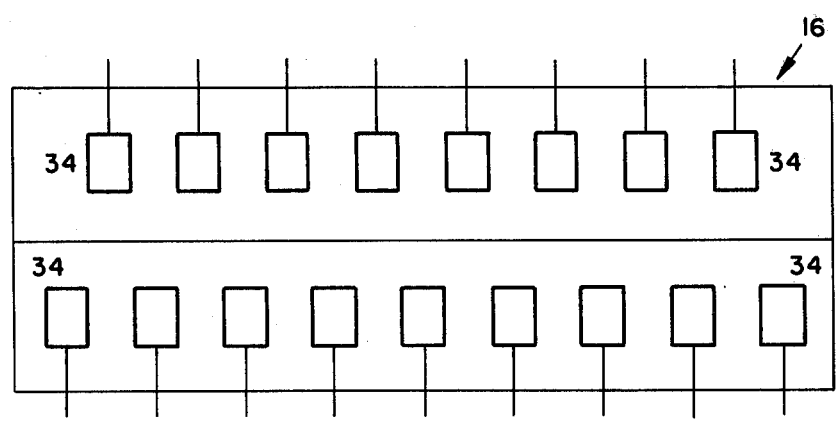
FIG. 3 is one possible arrangement of CCD's forming a detector array.

FIG. 3 is a top view of one possible detector array. The array is marked generally by 16. The electrodes 34 are marked as in FIG. 2. The two rows shown are staggered so that wavelengths present are not lost if they fall between electrodes of any single CCD. All leads shown are monitored by the control electronics shown in FIG. 1. Higher reliability and resolution can be obtained by use of more rows of CCDs with more variations of overlapping.

What is claimed is:
1. In a spectrometer having a dispersive element to refract incident light into its' component wavelengths, a detecting means to determine which wavelengths are present, and a readout means for observing the wavelength information detected, the improvement comprising:
   a plurality of charge coupled devices positioned to have the refracted light from the dispersive element spread over them;
   control means for timing the charge coupled devices so that they are periodically scanned for information they contain, said control means being operatively attached to the charge coupled devices;
   amplifying means operatively connected to the charge coupled devices electrical output;
   a reference operated by said control means for comparing observed information on the charge coupled devices with known signals; and
   display means operated by the control means in conjunction with reception of signals from the reference and amplifying means.

2. A spectrometer as described in claim 1 wherein the display means is a cathode ray tube.

3. A spectrometer as described in claim 1 wherein the display means is a light emitting diode.

* * * * *